United States Patent [19]
Whelan et al.

[11] 3,809,479
[45] May 7, 1974

[54] SPUTTERING METHOD AND APPARATUS FOR QUANTITATIVE AND QUALITATIVE ANALYSIS OF MATERIALS

[76] Inventors: James M. Whelan, 1229-1/2 Flanders Rd., La Canada, Calif. 91011; Joseph E. Greene, 4 Patricia Ct., Champaign, Ill. 61820

[22] Filed: Nov. 26, 1971

[21] Appl. No.: 202,587

[52] U.S. Cl. .................. 356/85, 250/306, 250/307, 356/86
[51] Int. Cl. .............................................. G01j 3/30
[58] Field of Search ............ 356/85, 86; 250/49.5 P, 250/306, 307

[56] References Cited
UNITED STATES PATENTS
3,644,044  2/1972  Tolk et al. ............................ 356/85
3,699,334  10/1972  Cohen et al. ................... 250/49.5 P OTHER PUBLICATIONS
Glow Discharge Spectroscopy for the Analysis of Thin Films: J. E. Greene; published June, 1971. Dissertation presentated to the University of Southern California.

"Low–Energy Sputtering . . . Spectroscopic Methods;" Kreye; J. Appl. Phys. 35, No. 12 Dec. 1964, pg. 3575–3577.

Primary Examiner—Ronald L. Wibert
Assistant Examiner—V. P. McGraw
Attorney, Agent, or Firm—Fulwider, Patton, Rieber, Lee & Utecht

[57] ABSTRACT

Method and apparatus for trace analysis and concentration profiling of thin film semiconductor sample layers. The samples are DC sputtered at a constant rate in argon and the cathode glow region of the glow discharge monitored for the maximum electroluminescence of the desired sample constituent.

12 Claims, 7 Drawing Figures

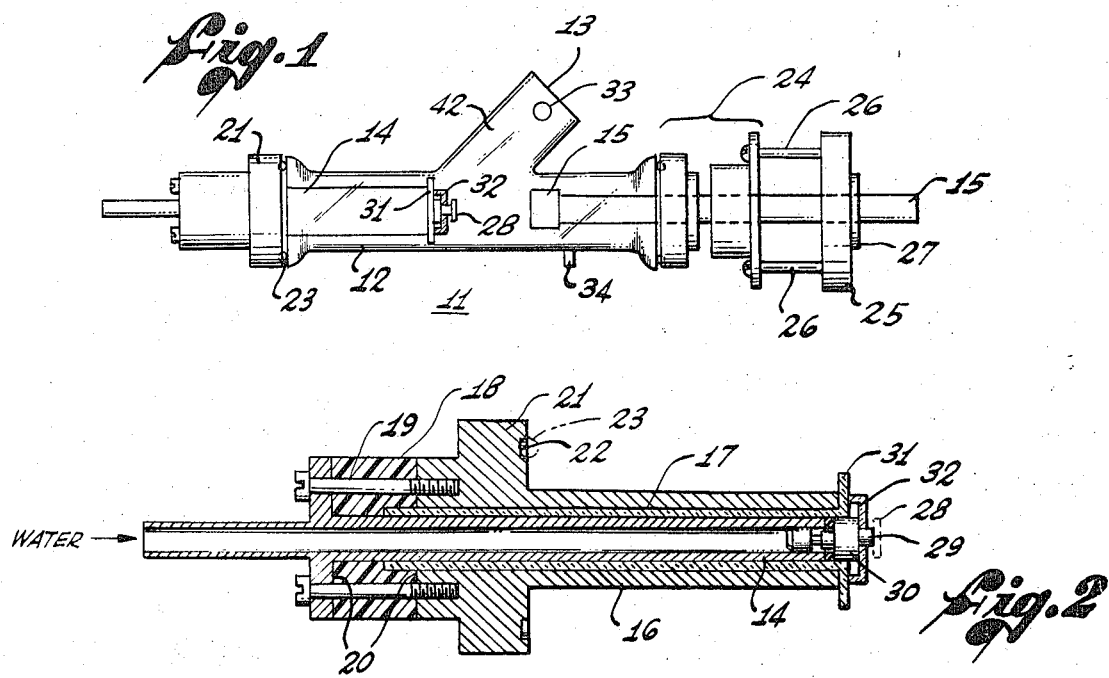
Fig. 1
Fig. 2
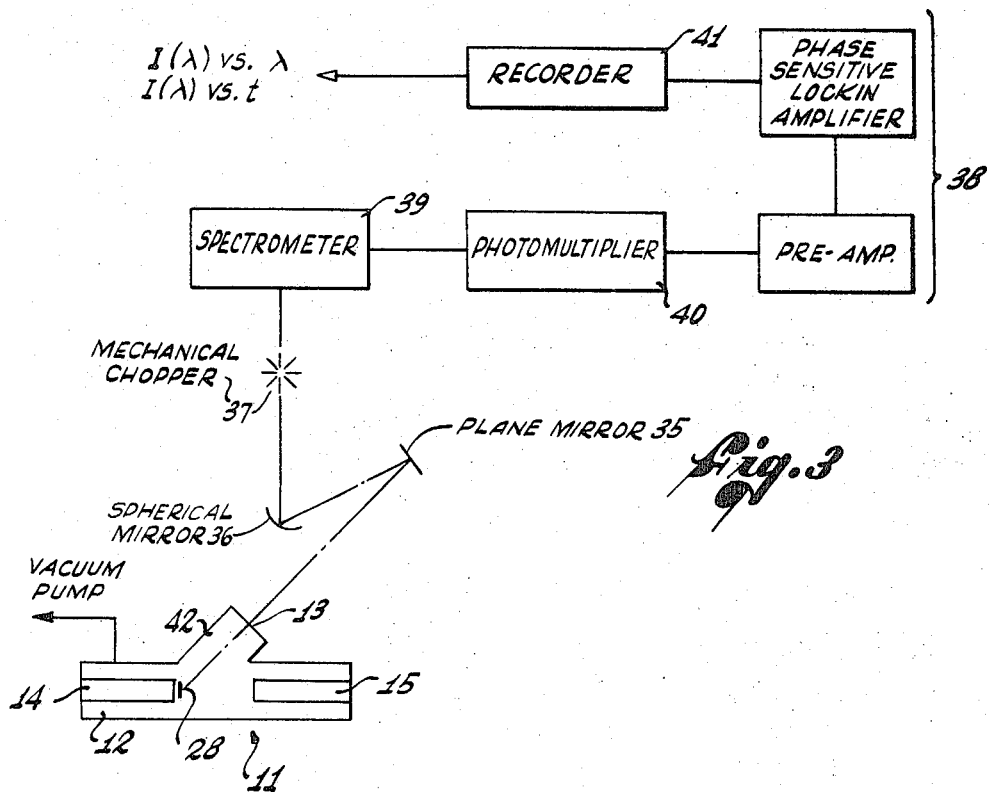
Fig. 3

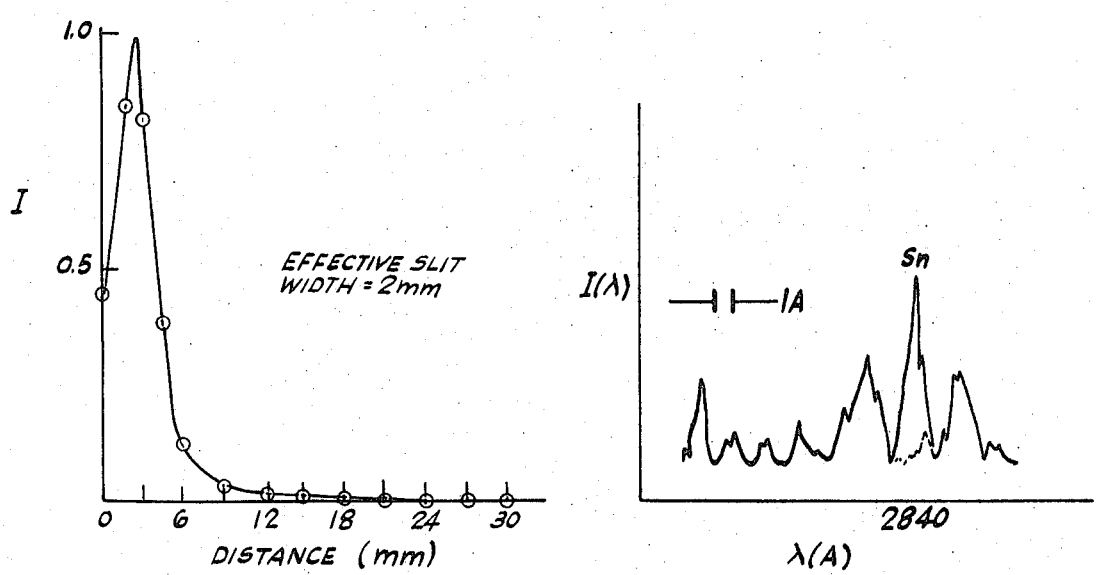
Fig. 4
Fig. 6
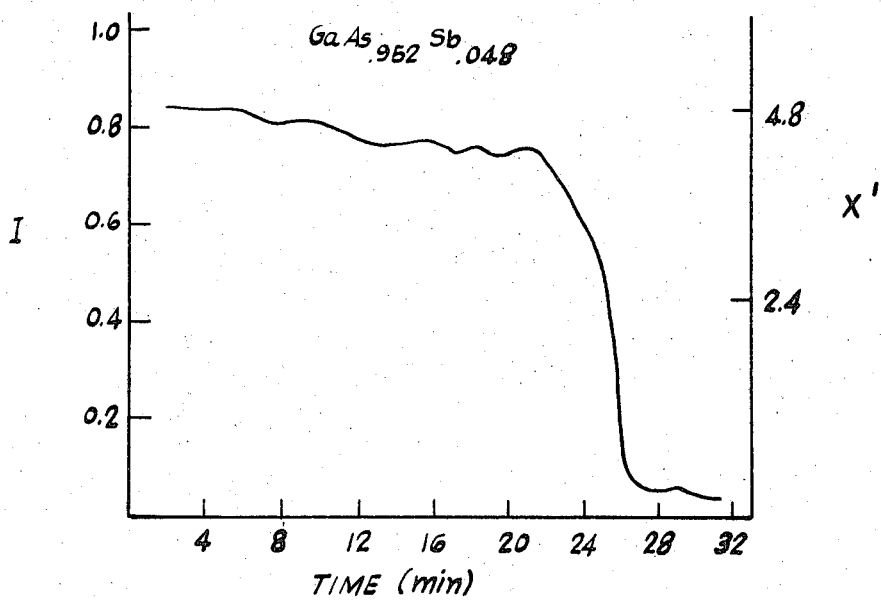
Fig. 7

3,809,479

SPUTTERING METHOD AND APPARATUS FOR QUANTITATIVE AND QUALITATIVE ANALYSIS OF MATERIALS

We have investigated a method useful for trace analysis of thin films which we have termed Glow Discharge Spectroscopy (GDS). In this technique, a target is sputtered in a low pressure gas discharge. The discharge is operated in the abnormal glow mode and its spectra is monitored for the electro-luminescence associated with desired sputtered target elements. Under suitable conditions, the intensity of the spectral line of an element in the target is proportional to the density of that element material in the region of the discharge under observation.

The presently available methods for trace analysis which may be applied to thin films are limited primarily by the small volume of sample available. Typical dimensions of the GaAs thin films described in the present application are 0.7 to 10 $\mu$m in thickness by 0.3 to 0.5 $cm^2$ in area. For a sample volume of $4\times10^{-5}$ $cm^3$ and an impurity concentration of $10^{17}$ atoms $cm^{-3}$ there are only $4\times10^{12}$ total impurity atoms available for analysis. If the dopant is a heavy metal such as Sn, the total mass of impurity atoms is $7\times10^{-10}$ g.

The use of sputtering as a means for atomizing the sample offers several distinct advantages. The etch of depth removal rate can be varied over a wide range (0.01 $\mu$m/min. to 10 $\mu$m/min.). No surface preparation of the sample is required. Sample contamination is not a problem since the film does not have to be chemically dissolved in a solvent. Most importantly, sputtering is basically a process which "etches" the sample in an "atom by atom" fashion. In the apparatus to be described, the sample or selected areas thereof are sputtered at a uniform rate (i.e., same mass per unit time per unit area) in a layer by layer manner over substantially all of the sputtered area. The discharge associated with sputtering in the abnormal glow regime provides a controllable source of excitation for sputtered atoms. DC sputtering is convenient for metals and semiconductors, whereas RF sputtering can be used for insulators.

BRIEF DESCRIPTION OF THE FIGURES

FIG. 1 is a plan view of the spectral analysis sputtering apparatus of the invention.

FIG. 2 is a sectional view through the cathode of the sputtering apparatus in the direction of its elongate axis.

FIG. 3 is a diagramatic presentation of the optical and electronic apparatus for monitoring the spectral emission within the sputtering apparatus.

FIG. 4 is a graphical representation for a gallium arsenide sample target of the neutral 2860.4 A line intensity plotted against distance from the target.

FIG. 6 is a graphical representation of two superimposed spectra, the solid line corresponding to a gallium arsenide sample containing $9\times10^{17}$ atoms $cm^{-3}$ of tin and the broken line corresponding to a gallium arsenide sample containing no tin.

FIG. 7 is a graphical representation of emission intensity (in arbitrary units) of the 2598 A antimony line as a function of time for a target epitaxial $GaAs_{.952}Sb_{.048}$ film on a GaAs substrate, with $x'$ depicting the relative mole fraction of Sb.

EXPERIMENTAL DESIGN

Figure 5:
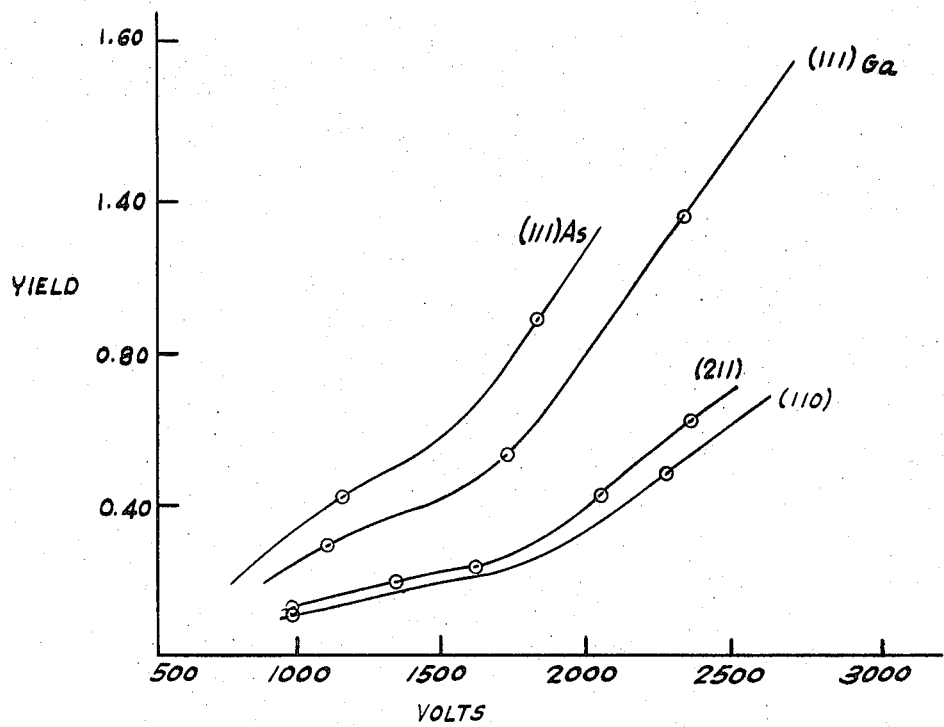
FIG. 5 is a graphical representation of sputtering yield (target atoms sputtered per unit of cathode current) plotted against applied voltage for four gallium arsenide sample orientations.

FIG. 1 shows a plan view of a sputtering module 11 of the invention. The module envelope 12 itself is pyrex glass with the exception of a viewing window 13 which is Ge Type 151 UV transmitting quartz. The module anode 15 and cathode 14 are both aluminum and are each water cooled through an axial bore therein. As shown in FIG. 2, grounded cylindrical aluminum sputter shield 16 fits coaxially over the cathode. The sputter shield and cathode are insulated by means of a pyrex sleeve 17 and a delrin plastic spacer 18 with delrin screws 19. Vacuum seals are made with viton O-rings 20.

The cathode sputter shield 16 has a head 21 thereon intermediate its ends with a groove 22 therein for receiving an O-ring seal 23 for sealing the cathode assembly to the left end of envelope 12. The cathode-anode interelectrode gap distance can be adjusted by axially sliding the anode 15 through a modified Veeco C-112 vacuum quick disconnect 24 which wedges an O-ring tightly around the anode to clamp the anode axially as well as provide a tight seal fit thereabout. A block 25 adjusted within 0.5 mm axially by screws 26 serves as a stop for shoulder 27 on the anode to limit inward (leftward) movement of the anode. A target sample 28 is mounted with silver paste on a mesa-like protrusion 29 of a demountable aluminum pedestal 30 which screws at its left end into the bore of cathode 14. Pyrex shields 31 and 32 are used to mask any exposed aluminum on the cathode assembly from the plasma to prevent arcing between the pedestal and the grounded shield 16 and to prevent sputtering of the pedestal. Shield 31 is an annular disc around pedestal 30 extending radially outward past shield 16. Shield 32 is a cup disposed rearwardly over the pedestal with protrusion 29 extending through a hole in the cup bottom a slight distance beyond the cup. The back side of target 28 is thus close to cup 32 so that the cup in effect masks the back side and prevents sputtering thereof. The opposing faces of anode 15 and cathode 14 are generally planar and parallel to one another to insure a uniform sputtering rate. For a constant thickness target 28, the target front surface (the right hand surface in the FIGURES) would be parallel to the end of anode 15.

A gas inlet 33 was placed next to the window 13 to minimize the deposition of sputtered material on the window. In operation, the system is purged several times with argon gas and pumped down to a pressure of less than $10^{-3}$ torr with a rotary vane pump. The output line 34 from the sputtering module is isolated from the mechanical pump by a liquid nitrogen cold trap. Ar used in these experiments had an initial purity of 99.998 percent. It was passed through a quartz trap containing titanium sponge at 900° C to remove traces of $O_2$, $N_2$, hydrocarbons and water vapor. After the initial pump down, the operating Ar pressure of 0.1 torr was maintained by bleeding the purified gas into the pumped module at an approximate rate of 0.5 $cm^3$ atm/min.

A voltage established between the cathode and the anode ionizes the argon gas and accelerates the Ar ions which bombarded the target 28. Target atoms are ejected primarily in their neutral ground states and are subsequently excited in the plasma. As shown schematically in FIG. 3, the electroluminescence is focused by a set of mirrors (plane mirror 35 and spherical mirror 36), chopped by chopper 37 at a frequency in synchronous with a phase sensitive lock-in amplifier 38, monochromaticized by a scanning spectrometer 39, and detected by an EMI 6256 S photomultiplier 40. The 1,200 groove per mm grating in the spectrometer was blazed for a wavelength of 2,000 A. The $f$ number of the spectrometer was $f8$ but the geometry of the mirrors was such that the effective f number of the optical system was $f16$. The amplifier signal was recorded at 41 as either intensity vs. wavelength or intensity vs. time.

EXPERIMENTS

Experiments were performed to determine in which region of the discharge the maximum target atom electroluminescence occurs. A module with the snout perpendicular to the cylindrical axis was used. Two alignment slits were placed between the module window and the plane mirror. Using this arrangement, the light incident upon the spectrometer slit originated from a narrow slice of the discharge. The module was mounted on the tracks of an optical bench so that it would be translated in a horizontal plane perpendicular to the spectrometer slit. This permitted the spectra to be examined as a function of distance between the electrodes. FIG. 4 shows the neutral 2860.4 A line intensity as a function of distance from a GaAs target 28. The smaller slope on the left side of the maximum is due to the discharge geometry. The maximum intensity occurs in the cathode glow region at approximately 2.5 mm from the target surface. Calculations also showed that this is the region in which the ejected target atoms have experienced enough collisions to have given up their initial ejection kinetic energies. In these calculations the mean free path for a "hot" atom in a thermalized gas was used. The ejection energies were estimated from the work of Stuart et al. (R. V. Stuart and G. K. Wehner, J. Appl. Phys. 35, 1819 [1964]; R. V. Stuart, K. Brower, and W. Mayer, Rev. Sci. Instr. 35, 425 [1963]). Elastic collisions and random walk isotropic scattering were assumed although a correction was made for the "persistance" of velocity (J. Jeans, *Kinetic Theory of Gases* [University Press, Cambridge, 1967]).

Knowledge of the intensity distribution in FIG. 4 provided the basis for selecting the analysis module shown in FIG. 3. This module configuration insured that the measured electroluminescent intensities were independent of minor uncertainties in alignment. To this end, window 13 is placed at the end of a snout 42 angled at 45° with respect to the sputtering module axis. This served to increase the viewed path length of the maximum intensity discharge portion to provide an increase in detection limits.

Our use of glow discharge spectroscopy for chemical analysis depends upon the luminescent intensity due to a particular target constituent being proportional to the sputtering rate. This proportionality was suggested by Stuart and Wehner (R. V. Stuart and G. K. Wehner, Phys. Rev. Letters 4, 409 [1960]; Appl. Phys. 33, 2345 [1962]). To establish this proportionality we measured the relative spectroscopic yield curves for several GaAs orientations and established that these could be normalized with absolute yield data. Yield curves were measured for the following orientations: (111)Ga, (111)As, (110), and (211). All samples used were single crystals with chemically polished planes corresponding to one of the above orientations.

The spectroscopic yield is presently defined as the emission intensity measured in arbitrary units divided by the cathode current. The emission intensity was monitored for transitions from neutral excited states to neutral ground states. The relative yield curves for all orientations mentioned above were measured and checked using both Ga and As lines at 2874.2 A and 2860.4 A respectively. Data points were taken at intervals of 50 or 100V and the results are summarized as the solid curves in FIG. 5.

Each curve in FIG. 5 was normalized with an absolute yield measurement and the normalization checked with other absolute yield data. Absolute or mass yield is defined herein as the number of target atoms sputtered per second per unit of cathode current in electronic charge per second. This definition of mass yield is identical to the usual one, the number of target atoms ejected per incident $Ar^+$ ion, if current contributions by secondary electrons and multipy charged ions are neglected. These current components are less than 20 percent of the total. Absolute measurements were made using the "change in mass" technique as discussed in detail by Kaminsky (M. Kaminsky, *Atomic and Ionic Impact Phenomena on Metal Surfaces* [Academic Press, New York, 1965]). The absolute yield data are indicated by circles in FIG. 5. The normalized spectroscopic yield curves agreed to within 6 percent of the absolute yield data. These results established the proportionality between the sputtering rates and the luminescent intensities. The yield curves proved to be highly reproducable and served as a sensitive monitor of the sputtering rate. Errors in the absolute yield measurements are estimated to be less than 3 percent.

From FIG. 5 it can be seen that the sputtering yield varies as the crystal transparency (G. D. Magnuson and C. E. Carlston, J. Appl. Phys. 34, 3267 [1963]; A. L. Southern, W. R. Willis, and M. T. Robinson, J. Appl. Phys. 34, 153 [1963]), i.e., the number of atoms per unit area in a plane normal to a particular direction. The more tightly packed planes exhibit higher sputtering yields. Channeling effects M. T. Robinson and O. S. Oen, Appl. Phys. Letters 2, 30 [1963]) may also play some role especially at the higher energies. A polarity effect is evident in the (111) planes. The (111) plane sputters faster in agreement with chemical etching work done by Gatos and Lavine (H. C. Gatos and M. C. Lavine, J. Electrochem. Soc. 107, 427 [1960]). These authors showed that the As face is the more reactive with respect to chemical etches. In addition, there is a change in the energy dependence of the yield function between 1,300 and 1,700 V. The knee in the yield curve occurs at lower energies for planes with higher sputtering rates.

TRACE ANALYSIS

Tin was selected as the main impurity to be studied in GaAs for three reasons:

1. It has a high emission intensity in a copper arc (National Bureau of Standards, *Tables of Spectral Line Intensities*, N.B.S. Monograph 32, Part 1);
2. It is an important dopant in GaAs; and 3. The tin peak at 2,849 A occurs in a spectral region in which Ar is fairly transparent thereby minimizing background intensity problems.

FIG. 6 shows two superimposed spectra that were taken to establish the detection limit for Sn in GaAs. The solid curve is the spectra for a GaAs sample containing $9 \times 10^{17}$ Sn atoms $cm^{-3}$ and the dotted line is for a GaAs sample containing no Sn. Both samples had the same area and they were sputtered under the same conditions. The spectral resolution was better than 1 A. All peaks not labeled, including the shoulder peak at 2841 A on the Sn line, are due to Ar. Variations in the background intensities of the Ar spectral peaks are less than 10 percent from one run to another. Within these limits the observed Sn emission line can be corrected for the Ar background. The concentration of Sn in a given GaAs sample is estimated by comparing the intensity of the Sn line with that of a GaAs standard containing a known amount of Sn. For each sample the Sn line intensities are measured in units of either a Ga or As peak intensity which is highly reproducable as indicated by the repeatability of the yield curves. On the other hand, comparison with a standard sample would not be required if the relative electroluminescent intensities of Sn and Ga or Sn and As are known by other means for comparable sputtering conditions, in which case the concentration of Sn is estimated by comparison of the Sn intensity with that of either Ga or As.

The current detection limit for Sn in GaAs was estimated from the spectra in FIG. 6 and the sputtering conditions, i.e. a sample area of 0.38 $cm^2$ and a sputtering rate of 0.07 $\mu m/min$. The detection limit was conservatively selected as the Sn concentration for which the intensity of the Sn peak is equal to that of the Ar shoulder peak at 2841 A. Sn can be detected at lower levels but the reproducability is less. Using this definition of detection limits, the minimum weight of Sn that can presently be detected is $7 \times 10^{-10}$ g. The minimum concentration of Sn that we can detect is $3 \times 10^{16}$ atoms $cm^{-3}$. This is for a sample with an area of 0.5 $cm^2$, a thickness of 2.0 $\mu m$, and a sputtering rate of 0.3 $\mu m/min$. A Sn concentration of $9 \times 10^{17}$ atoms $cm^{-3}$ can be detected in a GaAs film only 0.7 $\mu m$ thick with a surface area of 0.4 $cm^2$. The reproducability of all of these measurements is within 10 percent.

In addition to Sn the following elements have also been detected: Ga, As, Sb, Al, Si, and Cu. Detection limits have not been established for these elements. Estimated limits are $\approx 5 \times 10^{17}$ atoms $cm^{-3}$.

The sensitivity of GDS can be increased by increasing the number of electrons in the plasma available for excitation. Two possible methods for achieving this are the use of a transverse magnetic field or a hit filament. However, both of these methods cause non-uniform sputtering. Another possibility is to use a coherent light source of the proper wavelength for exciting the desired impurity. Lasers are becoming increasingly more available in the UV. However, light scattering may cause problems and would have to be considered.

The use of different sputtering gases should also be studied for two reasons. First, one should select a gas which is as transparent as possible in the spectral region of interest. Secondly, one should consider gases with low ionization potentials to increase the number of free electrons available for excitation. The use of Xe (which has a lower ionization potential than Ar), mixtures of rare gases, and specialty gases such as those used in nuclear detector tubes should be considered. However, care must be taken to choose a gas which does not react with the target species in the gas phase to produce species with lower emission intensities. Additives to a rare gas must also not form undesirable masking deposits on the target during sputtering.

CONCENTRATION PROFILING

Another application for GDS that we have investigated is the concentration profiling of alloy thin films. This technique can be used to estimate the concentration of the constituents as a function of depth through the alloy film. FIG. 7 shows a scan that was made while monitoring the Sb concentration in a $GaAs_{.952}Sb_{.048}$ film. The film was grown on a (111) As oriented GaAs substrate and was about 10 $\mu m$ thick. The sputtering rate was 0.3 $\mu m/min$. and the intensity of the Sb line at 2,598 A was monitored. The upper plateau is flat to within 10 percent, i.e. $\Delta x \leq 0.1 \, x$ where $x$ is the relative mole fraction of Sb. This indicates that the distribution of Sb is homogeneous to within 10% which is consistant with X-ray line broadening and photoluminescent measurements reported by C. T, Li (C. T. Li, Ph.D. Dissertation, University of Southern California, 1971). The variation is also within the range expected from the alloy growth conditions.

The depth of sample over which one can observe a meaningful change in the Sb concentration is limited primarily by the sputtering rate and the time constants of the amplifiers. In this case the depth resolution is about 0.2 $\mu m$. The sputtering rate of the above alloy film was found to be a factor of 2 less than that of (111) As oriented bulk GaAs. The reason for this is not obvious to us.

The variations in the upper plateau of FIG. 7 are greater than expected from background noise. They correspond to either small changes in the sputtering rate or inhomogeneities within the film. After the profile was teken, the GaAs substrate was sputtered under the same conditions except that this time the Ga line was monitored. The intensity response was flat to within 1 percent over the same length of time. In future alloy profiling experiments we intend to monitor the sputtering rate directly for each alloy sample. The Sb profile tails of within $\approx 1 \, \mu m$ which is more than the estimated distance for the film-substrate transition region. However, there are several reasons why this tail off region should not be interpreted too closely at present. It probably reflects simultaneous sputtering of the film and substrate. This would be caused by a variation in the film thickness over the sample area. Also some slight rounding of the sample occurs at the edges during sputtering. Finally, the difference in the sputtering yields between the film and the substrate tends to exaggerate the depth of the transition region. Either a guard ring or a $SiO_2$ window may be employed to minimize sample rounding by masking the sample edges. Masking layers may be utilized to selectively mask the sample to expose only preselected sample areas for sputtering.

CONCLUSIONS

Glow discharge spectroscopy provides an analytical technique for measuring and profiling the concentrations of constituents in thin films. For Sn in GaAs the detection limit is $3 \times 10^{16}$ atoms $cm^{-3}$ or 0.4 ppm by weight. In addition, we have shown that emission spectroscopy is a quick and sensitive method for measuring sputtering rate. The use of RF sputtering allows GDS to be applied to non-conducting targets. Background problems can be minimized by a judicious choice of the sputtering gas used. GDS is suitable for other applications such as diffusion studies and "non destructive analysis" where removal of ≈1 μm thick layers is acceptable.

Further discussion and documentation of the above analysis method and apparatus is provided by the dissertation of co-inventor Joseph E. Greene entitled "Glow Discharge Spectroscopy for the Analysis of Thin Films" prepared in partial fulfillment of the requirements for the degree Doctor of Philosophy, University of Southern California and published June, 1971. This dissertation is submitted as an unprinted appendix to the present specification and a copy thereof is contained in the official U.S. Patent Office file history of this case.

We claim:

1. An apparatus for spectral analysis comprising:
   an envelope having an elongate axis;
   aluminum, water-cooled anode and cathode electrodes within the envelope, the cathode having a pedestal portion at one end, the electrodes being spaced apart from each other by a distance of at least three millimeters along the elongate axis, the opposing faces of the electrodes being generally planar and parallel to one another;
   means for axially adjusting the anode electrode to change the inter-electrode spacing;
   high purity argon gas within the envelope at a pressure of about 0.1 torr;
   means for securing a semiconductor sample to the cathode pedestal portion, the sample having a target surface generally parallel to the anode face;
   means for applying a voltage in the range 800–3,000 volts to said electrodes to ionize the argon gas and sustain a glow discharge between the electrodes, the sample target surface being sputtered by bombardment of argon ions to eject atomic particles from the sample into the glow discharge between the electrodes, the sputtering being at a uniform rate of the same mass per unit time per unit area in a layer by leyer manner over substantially all of the sputtered area, the particles being raised to an excited state whereupon they emit characteristic spectral radiation upon return to a lesser excited state;
   sputter resistant shielding means about the cathode for preventing sputtering of the latter, the shielding means including a grounded aluminum sleeve disposed coaxially with and outward of the cathode and insulated therefrom, a cup-shaped glass cap disposed rearwardly over the pedestal portion of the cathode, the cap having bottom and sidewall portions with the pedestal extending into the cup interior and through an aperture in the cup bottom, the pedestal extending only a slight distance therefrom whereupon a sample secured to the pedestal and extending radially outwardly therefrom over the cup bottom is shielded by the cup bottom to prevent sputtering from the back surface of the sample;
   means for masking the semiconductor target surface peripheral edges to prevent sputtering and rounding thereof;
   means for observing the glow discharge to monitor the spectral luminescent intensity of a sample constituent as a function of time or wavelength, the spectral intensity being proportional to the quantity of the sample constituent present to ascertain the identity and quantity or concentration profile of the constituent; the observation means including a viewing snout extending outwardly from the envelope at 45° with respect to the elongate envelope axis, a window in the remote end of the snout and aligned to view the luminescent intensity of only a selected portion of the glow discharge, the selected portion being axially spaced 2.5 millimeters from the semiconductor target surface within the cathode glow region and representing a portion of maximum spectral intensity; optical means for viewing the selected discharge portion through the window; and means for adjustably mounting the envelope for limited orthoganol movement to precisely adjust the glow discharge viewed by the optical means; and
   gas inlet and outlet means for providing a flow of argon gas through the envelope at said pressure during the sputtering operation, the gas inlet being situated adjacent to snout window whereupon gas flow through the snout prevents deposition of sputtered material on the window.

2. A method of spectral analysis for determining the concentration of an element in a sample, said method comprising the steps of:
   sputtering the sample in a rare gas atmosphere in shch a manner that atoms are removed at a uniform rate over the sputtered area;
   forming a cathode glow region;
   maintaining a pressure within said atmosphere sufficient to sustain said cathode glow region and to provide a sufficiently long mean free path for sputtered atoms so that substantially any such stoms will be excited approximately only once before passing out of said cathode glow region, whereby substantially neutral ground state atoms sputtered from the sample are excited in said cathode glow region and emit photons upon returning to their neutral ground states;
   monitoring the intensity of the luminescence of the target atoms in said cathode glow region; and
   recording the monitored intensities thereby to provide an indication of the concentration of target atoms in the sample.

3. The method as defined in claim 2 wherein said pressure is maintained within the range of 0.07 to 0.20 torr.

4. The method as defined in claim 2 wherein said sample is conductive and is sputtered by applying a D. C. voltage within the range of 800 to 3,000 volts, and said pressure is maintained within the range of 0.07 to 0.20 torr.

5. The method as defined in claim 2 wherein said sample is substantially non-conductive and a high frequency potential is applied to a cathode behind said sample to cause said sputtering.

6. The method as defined in claim 2 wherein said monitoring is conducted within a distance of up to 10 millimeters from said sample.

7. The method as defined in claim 2 wherein said monitored intensities are recorded as a function of time.

8. A method for analyzing the constituents of a sample comprising the steps of:
sputtering the sample in a rare gas atmosphere in such a manner that atoms are removed at a uniform rate over the sputtered area;
forming a cathode glow region;
maintaining a pressure in said atmosphere sufficient to sustain said cathode glow region and to provide a mean free path length for sputtered atoms sufficient to insure that substantially any such stoms will emit approximately only one photon before passing out of said cathode glow region, whereby substantially neutral ground state atoms sputtered from the sample are excited in said cathode glow region and emit luminescence characteristic of the particular atom;
monitoring the spectra of emitted luminescence in the area of said cathode glow region; and
recording said monitored spectra as a function of wavelength.

9 The method as defined in claim 8 wherein said pressure is maintained within the range of 0.07 to 0.20 torr.

10. The method as defined in claim 8 wherein said sample is a conductor and is sputtered by applying a voltage within the range of 800 to 3,000 volts, and said pressure is maintained within the range of 0.07 to 0.20 torr.

11. The method as defined in claim 8 wherein said sample is substantially non-conductive and is sputtered by applying a high frequency potential to a metal cathode behind said sample.

12. The method as defined in claim 8 wherein said monitoring is performed within approximately 10 millimeters of said sample.

* * * * *